(12) United States Patent
Heyer

(10) Patent No.: US 8,407,906 B2
(45) Date of Patent: *Apr. 2, 2013

(54) WINDOW FRAME DEFLECTION MEASUREMENT DEVICE AND METHOD OF USE

(75) Inventor: Daniel Heyer, Lilburn, GA (US)

(73) Assignee: Cunningham Lindsey U.S., Inc., Lewisville, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/199,025

(22) Filed: Aug. 17, 2011

(65) Prior Publication Data
US 2012/0042530 A1 Feb. 23, 2012

Related U.S. Application Data

(63) Continuation of application No. 12/590,552, filed on Nov. 10, 2009, now Pat. No. 8,104,187.

(51) Int. Cl.
*G01C 9/00* (2006.01)
*G01B 5/20* (2006.01)

(52) U.S. Cl. ............ 33/375; 33/374; 33/376; 33/533

(58) Field of Classification Search ............ 33/374–376, 33/832, 833, 501.05, 501.08, 501.09, 533 33/548, 549, 551–555, 557, 560, 572
See application file for complete search history.

(56) References Cited

U.S. PATENT DOCUMENTS

| | | | | |
|---|---|---|---|---|
| 3,325,903 A * | 6/1967 | Zurlinden | ........................ | 33/557 |
| 3,439,430 A * | 4/1969 | Harris | ........................ | 33/555.1 |
| 4,176,461 A * | 12/1979 | Gebel et al. | .................. | 33/555.1 |
| 4,289,382 A * | 9/1981 | Clark | ................................ | 345/50 |
| 4,428,126 A * | 1/1984 | Banks | ............................ | 33/412 |
| 4,691,443 A | 9/1987 | Hamilton et al. | | |
| 4,718,173 A * | 1/1988 | Eklund | ............................ | 33/533 |
| 4,862,595 A | 9/1989 | Drumright | | |
| 4,894,920 A * | 1/1990 | Butler et al. | ................ | 33/203.11 |
| 4,939,848 A | 7/1990 | Armstrong | | |
| 5,189,798 A | 3/1993 | La Force | | |
| 5,303,480 A | 4/1994 | Chek | | |
| 5,343,628 A | 9/1994 | Ham | | |
| 5,388,338 A | 2/1995 | Majors | | |
| 5,433,011 A | 7/1995 | Scarborough et al. | | |
| 6,041,510 A | 3/2000 | Huff | | |
| 6,442,857 B1 | 9/2002 | Atsuhiko et al. | | |
| 6,460,264 B1 | 10/2002 | Bos et al. | | |
| 6,497,047 B1 * | 12/2002 | Miyagawa et al. | ............. | 33/533 |
| 6,550,152 B2 * | 4/2003 | Myrick | ............................ | 33/526 |
| 6,640,455 B1 | 11/2003 | Smothers | | |
| 7,497,022 B1 | 3/2009 | Aarhus | | |
| 8,104,187 B2 * | 1/2012 | Heyer | ............................. | 33/375 |
| 2003/0033722 A1 | 2/2003 | Lanham | | |

* cited by examiner

*Primary Examiner* — Christopher Fulton
(74) *Attorney, Agent, or Firm* — Shultz & Associates, P.C.

(57) ABSTRACT

A portable device for measuring deflection of a surface, comprising an elongate frame having a first end and a second end and a first datum surface, a first removable reference assembly adjacent the first end, a second removable reference adjacent the second end, a deflection gauge attached to the elongate frame between the first removable reference assembly and the second removable reference assembly, and wherein the deflection gauge engages and measures a deflection of the surface relative to the first removable reference assembly and the second removable reference assembly.

22 Claims, 5 Drawing Sheets

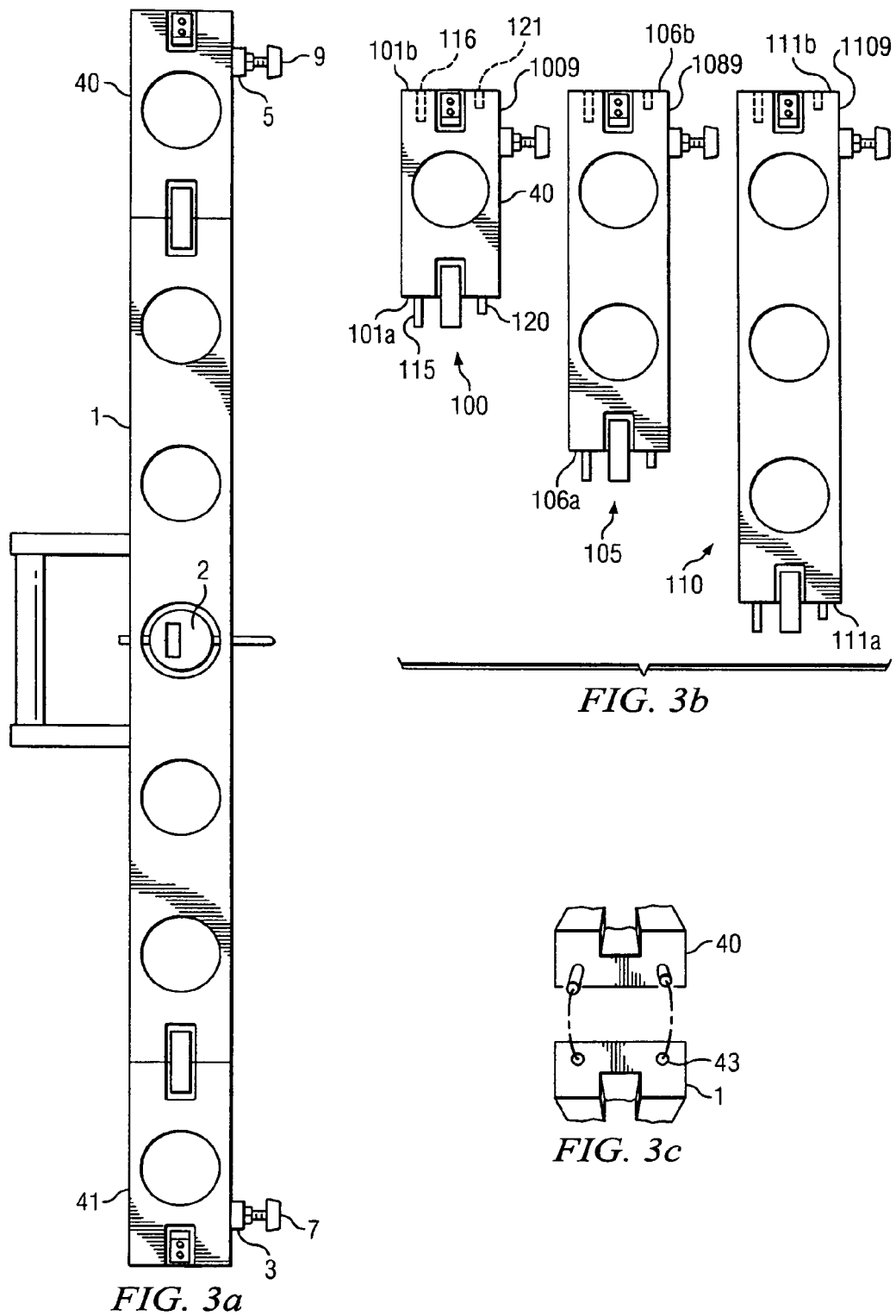

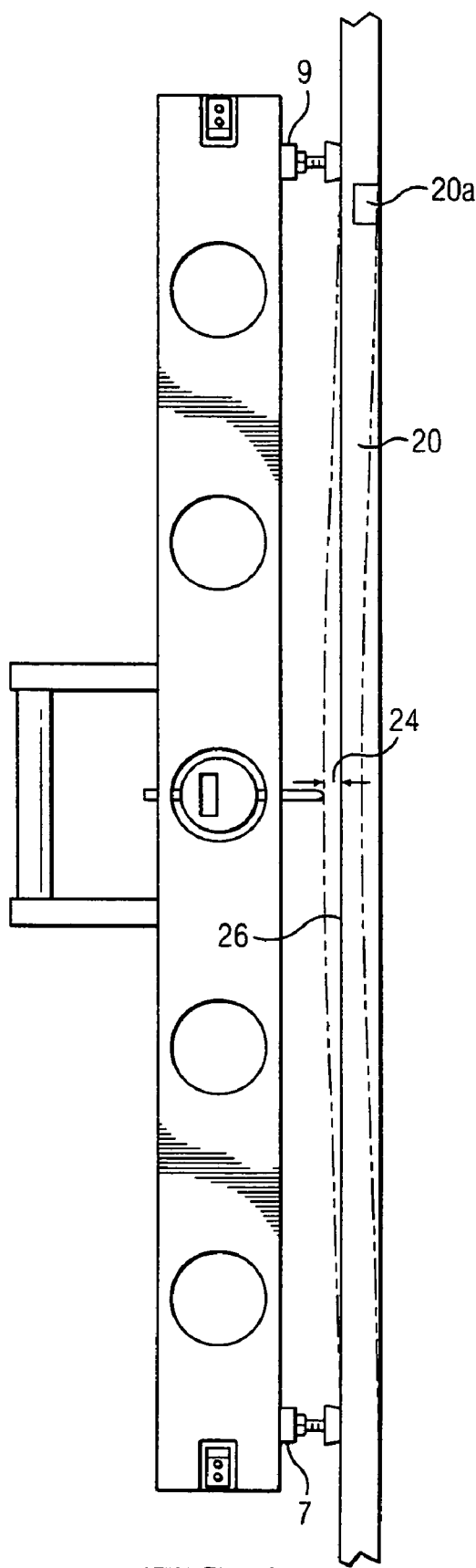 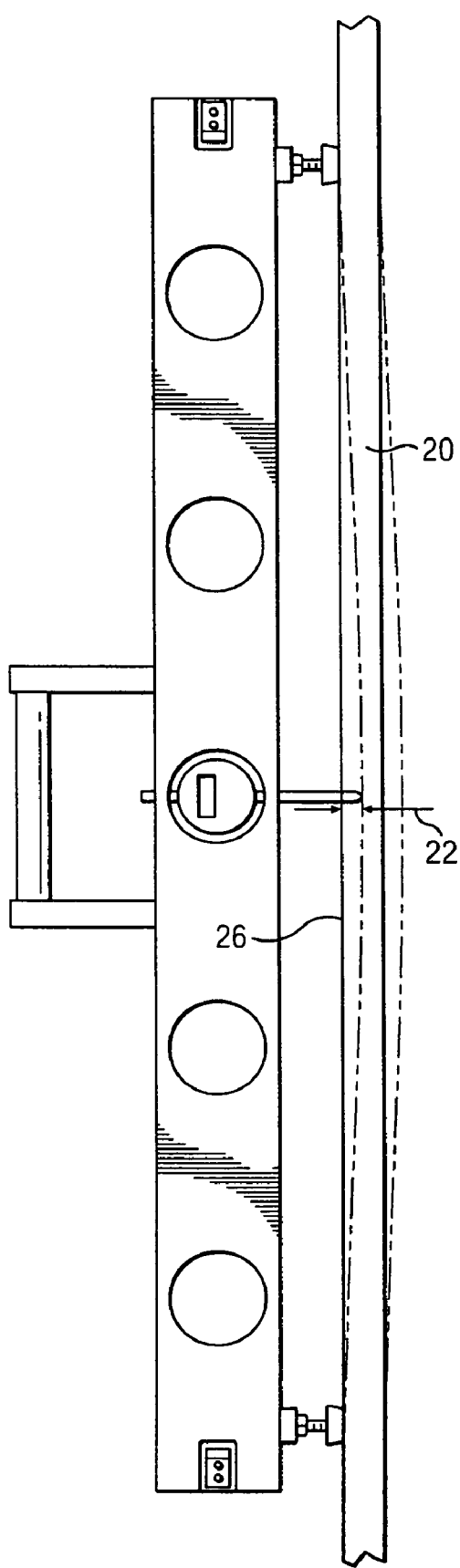
*FIG. 6A*     *FIG. 6B*

WINDOW FRAME DEFLECTION MEASUREMENT DEVICE AND METHOD OF USE

CROSS REFERENCE TO RELATED APPLICATION

This application is a continuation of U.S. application Ser. No. 12/590,552 filed Nov. 10, 2009, now U.S. Pat. No. 8,104,187 issued Jan. 31, 2012.

FIELD OF THE INVENTION

This invention relates generally to measurement of surface deflection of vertical surfaces and, more specifically, to measurement of deflection of a window or door frame.

BACKGROUND OF THE INVENTION

In many fields, it is often necessary to measure the amount that a vertical surface or frame has been bent or deflected. Such a situation arises in disaster recovery in response to wind damage or other accidents or natural disasters. Measurement of damage is necessitated by retrofit procedures which may be required as well as insurance recovery and insurance adjustment.

One of the major problems in measuring the deflection over longs spans, such as in large window frames, is the lack of convenient, portable tools to measure the deflection. A typical tool available is a mason's bubble level as well known in the art. A bubble level determines whether a surface is level and plumb (truly vertical or horizontal), but does not quantify the deflection of the surface.

U.S. Pat. No. 5,388,338 to Majors discloses an expandable screed level. The level has an open rectangular cross section and uses liquid bubble levels to determine slope. The device is expandable by adding additional sections at either end. The additional sections attach by means of a smaller rectangular cross section that fits inside the main body. The additional sections are retained in position by use of a latching mechanism. However, Majors makes no provision for measuring the displacement of a warp in a frame.

U.S. Pat. No. 5,433,011 to Scarborough et al discloses an expandable level. The level is expandable as a straight level, a square, a T-square and other shapes. Additional sections are added to the main body through a tongue and groove arrangement. A pressure screw is tightened to lock the pieces together. The device measures slope through use of liquid bubble levels. Each expansion piece contains at least one level. However, no provision for measuring deflection of a frame is provided.

U.S. Pat. No. 4,939,848 to Armstrong discloses an improved alignment gauge to check misalignment of the body of a vehicle. The device determines the distance between various physical points on the vehicle in order to aid in proper alignment. The device consists of a needle indicator attached at one end of a beam. The beam supports a horizontal and vertical liquid bubble level. The invention produces a precise result, but does not address the problems of ease of transport and use. It does not measure deflection along a long linear surface.

U.S. Pat. No. 7,497,022 to Aarhus discloses an extendable level. Telescopic extensions are contained within a main body of the level extension. Each terminates in an end piece. The extensions are supported by cross members. Each cross member and the main body includes a liquid bubble level. The invention does not measure depth or deflection.

U.S. Publication No. 2003/0033722 to Lanham discloses a telescopic leveling instrument having a body and telescopic extensions. The telescopic extensions are oriented horizontally or vertically. The extensions are marked to allow distance measurement. The main body includes a bubble level. The device does not measure depth or deflection perpendicular to the surface.

U.S. Pat. No. 5,303,480 to Chek discloses a device to measure the amount of deviation of a patient's facial symmetry from a "standardized norm." The device consists of a rod shaped base and a portable probe that is movable horizontally. The base is placed against a patient's sternum and maintained at horizontal by monitoring a liquid bubble level. The probe is then set against various facial features and the horizontal and radial distance from the sternum to the probe is measured. However, the device does not provide a means to measure depth between two points on a particular surface or over long distances. Further, the device is incapable of measuring multiple points of deflection at the same time.

U.S. Pat. No. 4,691,443 to Hamilton, et al. discloses a vehicle alignment system. The system includes fittings connected to beams that allow access to a vehicle, while maintaining the measurement surfaces in horizontal or vertical orientation. Lasers are used to project X, Y and Z coordinates. The device is not portable. The device also does not provide a means to measure deflection of a freestanding vertical beam.

The prior art does not address the problem of measuring deflection in a vertical beam by a single individual. It is difficult and unwieldy for a single individual to hold prior art devices against such a window frame and measure the deflection accurately or consistently.

Therefore, a need exists for a device for measuring deflection of large surfaces, including window frames, which can be operated single-handedly. A need also exists for a deflection measurement device, which is portable and may be used in the field. Still further, a need exists for a simple uncomplicated device to measure deflection of a vertical beam at or around its center point. A further need exists for a device which is expandable to fit both large and small spans, without the need for additional tooling or calibration. A still further need exists for a device to measure many points of deflection over a surface simultaneously between a pair of reference points.

SUMMARY OF THE INVENTION

In one embodiment, the device comprises an elongate frame having an adjustable reference assembly located at each end. A gauge is located centrally in the elongate frame and positioned to measure a deflection from two calibrated reference assemblies. A centrally located handle is provided for ease of use, allowing a single individual to hold the device and manipulate the measurement gauge.

Expansion sleeves are provided that attach precisely and rigidly to each end of the frame in order to expand the span of the device. The reference assemblies are then removed and placed at the end of the additional lengths. The reference assemblies are designed and constructed so that re-calibration is not required. In another embodiment, the additional lengths incorporate additional pre-calibrated reference assemblies.

In another embodiment, the deflection at several locations along a given frame may be measured by repositioning the support frame, or, in another embodiment, by employing several gauges simultaneously.

In use, the device is first calibrated. Then, the reference assemblies are positioned against a span of window frame or other surface by manipulation of the elongate frame. The gauge in the elongate frame provides a reading of deflection.

BRIEF DESCRIPTION OF THE DRAWINGS

The disclosed embodiments will be described with reference to the accompanying drawings. Like pieces in different drawings carry the same number.

FIG. 3a is a side view of a preferred embodiment that includes expansion sleeves.

FIG. 3b is a side view of several expansion sleeves of different lengths.

FIG. 3c is an assembly view of the elongate frame and an expansion sleeve.

FIG. 6A is a side view of a preferred embodiment resting against a surface in a deflection state.

FIG. 6B is a side view of a preferred embodiment resting against a surface in a deflection state.

DETAILED DESCRIPTION

Figure 1:
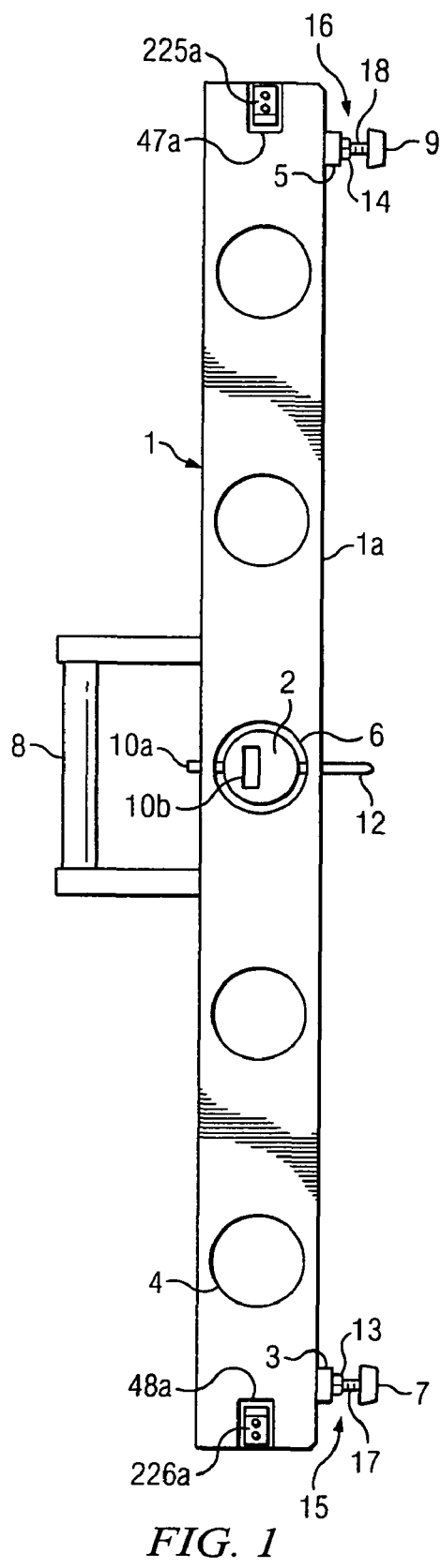
FIG. 1 is a side view of a preferred embodiment.
Figure 2:
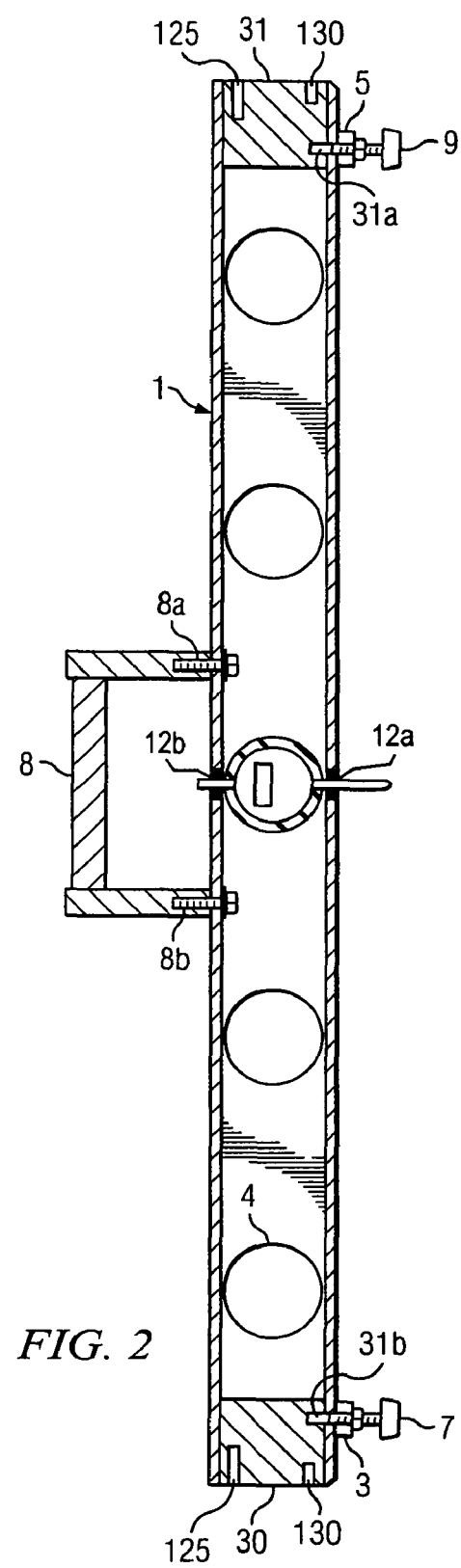
FIG. 2 is a partial section side view of a preferred embodiment.

Referring to FIGS. 1 and 2, the device includes elongate frame 1. Elongate frame 1 is a rectangular tube having a base length of approximately three feet. Bottom surface 1a of elongate frame 1 in a preferred embodiment is machined flat. The flat surface forms a first datum surface. Elongate frame 1 has a plurality of weight reduction holes 4. Center cavity 6 is supplied for mounting of gauge 2. End caps 30 and 31 are solid aluminum billets that are sized to fit precisely into the ends of the rectangular channel of elongate frame 1.

In a preferred embodiment, the end caps are epoxied in place and machined flat and perpendicular to bottom surface 1a. The end caps are perpendicular to bottom surface 1a. End caps 30 and 31 each contain holes 31a and 31b, sized to receive reference assemblies 15 and 16. End caps further include guide holes 125 and 130. Recesses 47a and 48a are located at each end of elongate frame 1. Catch support 225a resides in recess 47a. Catch support 226a resides in recess 48a.

In a preferred embodiment, elongate frame 1 may be made from an extrusion, milled from stock or cast. An aluminum magnesium alloy is preferred for cost and weight considerations. However, elongate frame 1 may be constructed of other rigid materials capable of maintaining a very low central beam deflection for moderate to light loads, on the order of 25 pounds. Lighter weight materials are preferred. For extremely high precision applications, stainless steel or titanium may be employed, resulting in extremely low deflections over large spans. Cross sectional shapes can vary. In a preferred embodiment, an "I" beam extrusion is employed having the highest rigidity to weight ratio available. Rectangular and box extrusions are also preferred as having high rigidity.

Handle 8 extends from the center of elongate frame 1. The handle is centrally positioned between the reference assemblies to provide equal pressure to the reference assemblies when in use and to facilitate ease of positioning by a single user. Handle 8 is attached to the elongate frame 1 using screws 8a and 8b passing through the inside of elongate frame 1 or by welding. Other methods of removable or permanent attachment may be employed as known in the art. A removable handle is preferred to aid in compact storage for shipment.

Gauge 2 is operatively positioned in mounting hole 6. Gauge 2 includes probe 12, retention knob 10a, and data read out 10b. Probe 12 extends radially from the bottom of gauge 2 through access hole 12a in elongate frame 1. Hole 12a is sized to avoid interference with the radial movement of probe 12. Similarly, retention knob 10a extends radially through access hole 12b in the top of elongate frame 1. Access hole 12b is sized to allow free motion of the retention knob. Probe 12 is spring loaded to facilitate ease of use. Retention knob 10a follows the movement of probe 12. Retention knob 10a secures probe 12 to gauge 2 preventing over-extension or loss of probe 12 due to the spring.

In a preferred embodiment, gauge 2 is a 543-683B electronic digital indicator manufactured by Mitutoyo of Tokyo, Japan. Another viable option is a depth gauge manufactured under part number CEN44345 and offered for sale by Central Tools/Central Lighting. In another embodiment, the gauge can include an electronic memory including time and date indexing so that the time and date of measurements taken can be recorded. Furthermore, gauge 2 may include a memory for alphanumeric tagging of each measurement so that notes may be made as to the location of the window frame being measured. In this embodiment, electronic downloading of this data is provided to a laptop computer for later use. An RFID tag may be applied to the physical window frame corresponding to the deflection tagging for later positive location and correlation with the deflection measurement.

In another embodiment, gauge 2 may be an optical or acoustic distance measuring device. An example of an optical measuring device is Leica Disto's model 740690, which measures distance via a laser. An example of an acoustic measuring device is the Intellimeasure model 77-018 from Stanley Tools, which measures distance via ultrasonic waves. Other such measuring devices are known in the art and may include wireless data capture via a computer. Gauge 2 may also include a button to zero the readout at a given height during calibration.

While preferred embodiments of this device are described as having a manually adjustable gauge, other gauges and measurement devices may be utilized. Further, seals for moving parts are not required for all uses and types of gauges.

Referring to FIG. 3a, the span of the device may be increased by adding extensions 40 and 41 to each end of elongate frame 1. Referring to FIG. 3b, in a preferred embodiment, extensions 100, 105, and 110 are different lengths of 3 inches, 6 inches and 12 inches, respectively. Other lengths of extensions may be utilized. Extensions 100, 105 and 110 are constructed of hollow rectangular channel having solid ends 101a and 101b, 106a and 106b, and 111a and 111b. The solid ends are epoxied into each end of each extension, respectively. Bottom surfaces 1009, 1089, and 1109 are each machined flat to match bottom surface 1a of elongate frame 1. The bottom surfaces form datum surfaces for calibration. Each solid end is also machined to be perpendicular with the bottom surfaces.

Each extension includes a set of guide pins 115 and 120 and a set of guide holes 116 and 121. Guide holes 116 and 121 are sized to provide a close fit with guide pins 115 and 120. Guide pins 115 and 120 are different diameters and different lengths so that the extensions may be assembled with the elongate frame in the proper orientation.

Referring to FIG. 3c, the guide pins are engaged with corresponding guide holes until one or more extensions meets elongate frame 1. The extensions are attached to the elongate frame singularly or in groups, thereby variably extending the length spanned by the device.

Figure 3D:
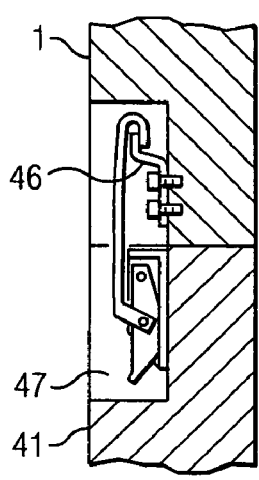
FIG. 3d is a partial section view of the elongate frame and an expansion sleeve.
Figure 4:
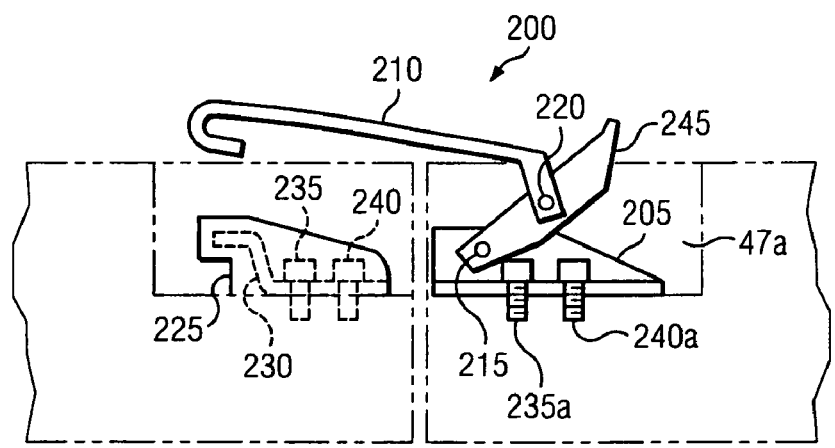
FIG. 4 is a detail view of a latch mechanism.

Referring to FIGS. 3d and 4, an extension is removably engaged with elongate frame 1 with latch assembly 200. Toggle arm 245 is advanced allowing latch 210 to engage catch 230. Toggle arm 200 is then rotated forcing latch 210 under catch support 225, thereby releasably securing the extension to the elongate frame.

Toggle support 205 resides in recess 47a located on each extension. Toggle support 205 is secured in recess 47a with bolts 235a and 240a. Toggle arm 245 is pivotally supported by toggle support 205 through hinge pin 215. Toggle arm 245 includes toggle pin 220 which pivotally supports latch 210. Each catch support is secured to the elongate frame by way of retaining screws 235 and 240. Each catch support includes a catch 230.

By way of example, FIG. 4 shows the construction of catch support 226a and catch 230 as well as the location of the retaining screws 235 and 240. Catch support 226a and catch 230 are formed from stamped steel plate in a preferred embodiment.

In another embodiment, each extension includes a pre-calibrated reference assembly in relation to elongate frame 1.

Figure 3E:
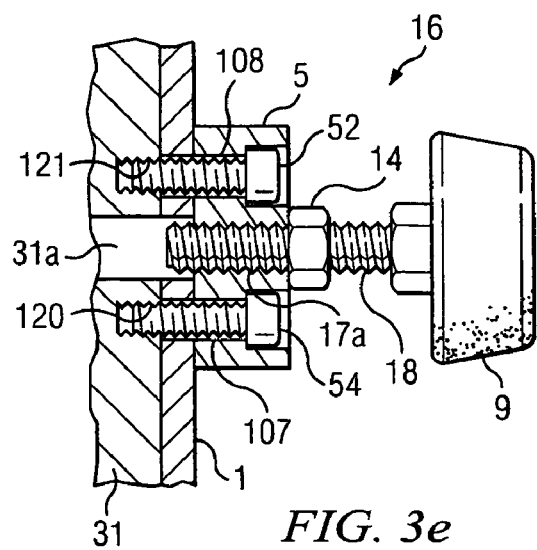
FIG. 3e is a partial section view of the adjustable reference assembly.
Figure 3F:
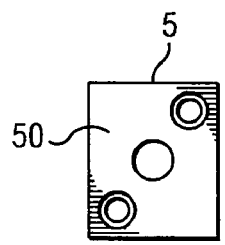
FIG. 3f is a top view of a mounting block.

Referring to FIGS. 3e and 3f, reference assemblies 15 and 16 are attached to elongate frame 1. Elongate frame 1 also includes a set of threaded holes for receiving mounting screws for reference assemblies 15 and 16. The threaded holes are shown by way of example in FIG. 3e as 120 and 121. Reference assemblies 15 and 16 include mounting blocks 3 and 5. Referring to FIG. 3f, by example, the top surface of mounting block 50 is machined flat to match the bottom surface 1a of the elongate frame. The flat surfaces form second and third datum surfaces from which the device is calibrated. Mounting blocks 3 and 5 are removably attached to elongate frame 1. Mounting blocks 3 and 5 include holes 107 and 108. Bolts 52 and 54 pass through holes 107 and 108 in mounting blocks 3 and 5 and thread into holes 120 and 121 in end cap 31. Each mounting block includes a threaded hole shown as 17a for receiving a threaded contact support 18. Threaded contact support 18 is retained in threaded hole 17a by locking nut 14. The threads are standard ASTM pitch. In high precision embodiments, threads with lesser pitch may be employed.

Each reference assembly further includes contact pad, shown by example as 9. In a preferred embodiment, each contact pad includes a flexible neoprene gasket. In other embodiments requiring greater accuracy, each contact pad may be comprised of a suitable rigid material such as nylon, delrin, aluminum or polished stainless steel. In applications where static discharge or contact with high voltage is a concern, the contact assemblies can be formed of bakelite or asbestos.

In a preferred embodiment, when extensions are added, the mounting blocks, along with contact assemblies 15 and 16 are removed from elongate frame 1 and attached to an extension by use of threaded bolts 52 and 54. Movement of contact supports 17 and 18 with respect to mounting blocks 3 and 5 is not required, and their calibrated height is retained by locking nut 14. Thus, relocation of contact assemblies 15 and 16 onto the extension without recalibration of gauge 2 is accomplished. Other extensions are added in a similar manner.

Figure 5:
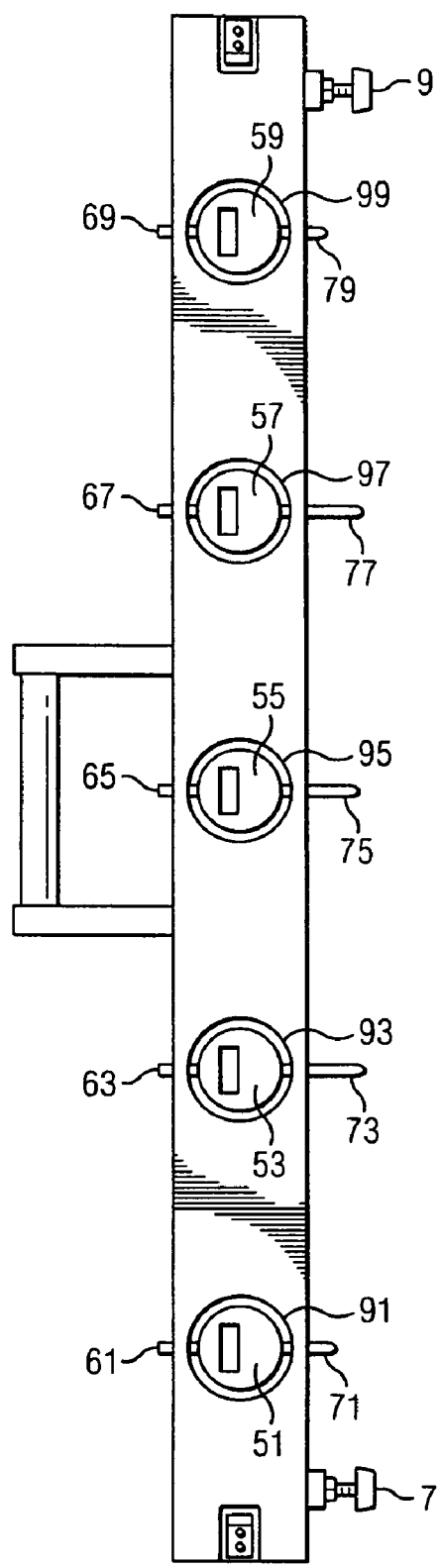
FIG. 5 is a side view of an alternative embodiment.

Referring to FIG. 5, in another embodiment, the device is configured to simultaneously take multiple measurements, such as when a vertical surface has been deflected in more than one plane and/or in more than one location. In this embodiment, gauges 51, 53, 55, 57, and 59 reside in holes 91, 93, 95, 97, and 99, respectively. Each gauge includes a retention knob 61, 63, 65, 67, and 69, respectively, and probe 71, 73, 75, 77, and 79, respectively.

In use, the device must first be calibrated. To calibrate the device, contact pads 7 and 9 are positioned on a flat calibration surface. A gauge block of known height, typically half of the probe's travel distance, is placed on the flat calibration surface and under the machined bottom surface 1a of elongate frame 1. Contact supports 17 and 18 are adjusted until elongate frame 1 comes to rest on the gauge block. Probe 12 of gauge 2 is spring loaded and provides a measurement of deflection when contact pads 7 and 9 come to rest against the surface. Gauge 2 is adjusted so that the gauge provides a neutral reading of the calibration surface. If additional contact assemblies are included on the extensions, they are attached to elongate frame 1 and calibrated in a similar fashion.

In another calibration embodiment, the gauge blocks may be replaced by a measurement device. A measurement device, such as a machinist square or a set of calipers is used to determine the distance between contact pads 7, 9 and machined bottom surface 1a. Contact pads 7 and 9 are then placed against a flat calibration surface and gauge 2 is zeroed against the surface. Alternatively, a measuring device may be used to set probe 12 at the same distance as contact pads 7 and 9. Probe 12 is then zeroed. It will be appreciated by those skilled in the art that zeroing of the gauge and extensions may be accomplished utilizing a multitude of methods without departing from the intent and scope of the invention.

Where gauge 2 has been properly calibrated, a positive displacement reading will show a deflection of frame 20 inward 22 (away from the device), a negative reading will show a deflection outward 24 (toward the device) and a reading of zero will show no deflection.

Referring to FIGS. 6A and 6B, in use, the device is positioned on a vertical, free standing surface, such as frame 26. Contact pads 7 and 9 are located at the extremities of the vertical surface and positioned by manipulating the elongate frame by the handle. Probe 12 meets frame 26 prior to either contact pad 7 or 9. As contact pads 7 and 9 move toward the surface, gauge 2 makes a measurement. Generally, the device will be located so that probe 12 meets frame 20 in the center, as this is often the area of greatest deflection. However, the device may be used to measure multiple locations along frame 26. Where RFID tag 20a is to be employed, it is affixed to frame 20, and its serial number is recorded and correlated with the deflection reading. In a multiple gauge embodiment, once contact pads 7 and 9 have been positioned, readings from each of the gauges may be taken and recorded simultaneously.

It will be appreciated by those skilled in the art that modifications can be made to the embodiments disclosed and remain within the inventive concept. Therefore, this invention is not limited to the specific embodiments disclosed, but is intended to cover changes within the scope and spirit of the claims.

The invention claimed is:

1. A portable device for measuring a deflection of a surface, comprising:
   an elongate frame having a first end, a second end, and a first datum surface;
   a first removable reference assembly having a second datum surface, adjacent the first end;
   a second removable reference assembly having a third datum surface, adjacent the second end;

the elongate frame member variably locked along a direction generally perpendicular to the elongate frame member at a calibrated distance from the surface by the first removable reference assembly and the second removable reference assembly;

a deflection gauge attached to the elongate frame between the first removable reference assembly and the second removable adjustable reference assembly; and wherein the deflection gauge engages and measures the deflection of the surface relative to the first removable reference assembly and the second removable reference assembly.

2. The device of claim 1, further comprising a handle attached to the elongate frame.

3. The device of claim 1, wherein the first reference assembly includes a first contact support, adjustable relative to the second datum surface and the second reference assembly includes a second contact support, adjustable relative to the third datum surface.

4. The device of claim 3, wherein the deflection gauge is calibrated relative to the first contact support and the second contact support at the calibrated distance.

5. The device of claim 3, wherein the second datum surface and the third datum surface are adjacent the first datum surface.

6. The device of claim 3, wherein the first contact support includes a first insulation means for electronic insulation from the surface and the second contact support includes a second insulation means for electronic insulation from the surface.

7. The device of claim 1, wherein the deflection gauge is one of the group of acoustic, mechanical, and optical.

8. The device of claim 1, further comprising:
a first extension having a fourth datum surface, attached to the first end of the elongate frame;
a second extension having a fifth datum surface, attached to the second end of the elongate frame; and
wherein the first reference assembly is attached to the first extension and the second reference assembly is attached to the second end and wherein the fourth datum surface and the fifth datum surface are adjacent the first datum surface.

9. The device of claim 8, wherein the first extension includes a first coupling means for engaging the elongate frame to orient the first removable reference assembly relative to the deflection gauge and wherein the second extension includes a second coupling means for engaging the elongate frame to orient the second removable reference assembly relative to the deflection gauge.

10. The device of claim 9, further comprising:
a third extension having a sixth datum surface, attached to the first extension;
a fourth extension having a seventh datum surface, attached to the second extension; and
wherein the sixth datum surface is adjacent the fourth datum surface and the seventh datum surface is adjacent the fifth datum surface.

11. The device of claim 1, farther comprising:
a first extension having a third reference assembly, removably coupled to the elongate frame;
a second extension having a fourth reference assembly, removably coupled to the elongate frame; and
wherein the deflection gauge is calibrated relative to the third reference assembly and the fourth reference assembly.

12. A portable device for measuring a deflection of a surface and operable by a single user, comprising:
a rigid elongate frame member;
a first foot adjustably attached to the elongate frame member;
a second foot adjustably attached to the elongate frame member;
the elongate frame member adjustably fixed along a direction generally perpendicular to the elongate frame member at a set height from the surface by the first foot and the second foot;
a measuring tool attached to the elongate frame member;
a probe associated with the elongate frame member; and
wherein the measuring tool measures the deflection of the surface by the probe touching the surface.

13. The device of claim 12, further comprising a handle attached to the elongate frame member.

14. The device of claim 12, wherein the elongate frame member further comprises weight reduction cutouts.

15. The device of claim 12, wherein the first foot and the second foot are coplanar.

16. The device of claim 12, wherein the measuring tool is attached between the first foot and the second foot.

17. The device of claim 16, wherein the measuring tool is calibrated relative to the first foot and the second foot at the set height.

18. The device of claim 12, wherein the measuring tool includes a memory for storing a deflection value.

19. A method for measuring a deflection of a surface, utilizing a portable device for measuring the deflection comprising: an elongate frame member having a plurality of weight reduction holes, a first foot adjustably attached to the elongate frame member, a second foot adjustably attached to the elongate frame member, the elongate frame member adjustably fixed at a set distance from the surface by the first foot and the second foot; a measuring tool attached to the elongate frame member between the first foot and the second foot; the method comprising the step of:
operating the measuring tool to determine the deflection of the surface.

20. The method of claim 19, further comprising the step of calibrating the measuring tool relative to the first foot and the second foot.

21. The method of claim 20, wherein the step of calibrating the measuring tool further comprises the steps of:
placing the first foot and second foot against a reference surface;
adjusting the first foot and the second foot so that the elongate frame member is parallel with the reference surface; and
measuring the set distance to the reference surface using the measuring tool.

22. The method of claim 20, wherein the step of calibrating the measuring tool further comprises the steps of:
placing the first foot and second foot against a known flat surface;
adjusting the first foot and the second foot, so that the elongate frame member is parallel with the known flat surface;
lowering the measuring tool to rest against the known flat surface; and
adjusting the measuring tool to read zero as it rests against the known flat surface.

* * * * *